(12) United States Patent
McKinley

(10) Patent No.: US 9,887,730 B2
(45) Date of Patent: *Feb. 6, 2018

(54) TIMING ESTIMATION IN COMMUNICATION SYSTEMS

(71) Applicant: Higher Ground LLC, Palo Alto, CA (US)

(72) Inventor: Bruce L. McKinley, South Riding, VA (US)

(73) Assignee: Higher Ground LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,823

(22) Filed: Jan. 10, 2017

(65) Prior Publication Data

US 2017/0149471 A1   May 25, 2017

Related U.S. Application Data

(63) Continuation of application No. 14/831,083, filed on Aug. 20, 2015, now Pat. No. 9,548,790.

(51) Int. Cl.
*H04B 1/00* (2006.01)
*H04B 1/7073* (2011.01)
*H04L 5/00* (2006.01)

(52) U.S. Cl.
CPC ......... *H04B 1/70735* (2013.01); *H04L 5/006* (2013.01)

(58) Field of Classification Search
CPC .................................. H04B 1/70735
USPC .......................................................... 375/149
See application file for complete search history.

(56) References Cited

U.S. PATENT DOCUMENTS

| 6,219,345 | B1 * | 4/2001 | Clark | H04B 7/2671 370/328 |
| 6,314,129 | B1 * | 11/2001 | Sunwoo | H04B 1/7085 375/149 |
| 8,488,578 | B1 * | 7/2013 | Fuemmeler | H04B 1/70735 370/341 |
| 9,548,790 | B1 * | 1/2017 | McKinley | H04B 1/70752 |
| 2010/0260207 | A1 | 10/2010 | Simmons | |
| 2014/0348215 | A1 * | 11/2014 | Rigolle | H04B 1/7113 375/148 |

OTHER PUBLICATIONS

Until Search Report and Written Opinion dated Sep. 15, 2016 in Int'l Application No. PCT/US2016/47600.
Office Action dated Mar. 24, 2016 in U.S. Appl. No. 14/831,083, by McKinley.

* cited by examiner

*Primary Examiner* — Lihong Yu
(74) *Attorney, Agent, or Firm* — Panitch Schwarze Belisario & Nadel LLP

(57) ABSTRACT

Apparatus and methods for symbol timing synchronization in a direct-sequence spread-spectrum receiver may use non-coherent integration, thresholding, peak selection, and curve fitting to determine appropriate timing instants at which to select despread samples for further processing, such as demodulation and decoding. The curve fitting may be used to search backwards and/or forwards in time to obtain the timing instants.

18 Claims, 5 Drawing Sheets

TIMING ESTIMATION IN COMMUNICATION SYSTEMS

CROSS-REFERENCE TO RELATED APPLICATIONS

This application is a continuation of co-pending U.S. patent application Ser. No. 14/831,083, also entitled "Timing Estimation in Communications System," filed Aug. 20, 2015, and incorporated by reference herein.

FIELD OF ENDEAVOR

Aspects of the present disclosure may relate to timing synchronization in communication systems and, in particular, may relate to timing estimation that may be particularly useful in situations of low signal-to-noise ratio (SNR).

BACKGROUND

In some situations, it may be useful, or even necessary, to transmit signals below a prescribed spectral energy, for example, to avoid interference with other signals being transmitted in a particular band. One way of doing this may be to use direct-sequence spread-spectrum (DSSS) techniques. DSSS may be used to spread the energy of a transmitted signal over a broad spectrum to avoid interfering with, or being interfered with by, other signals present in the same spectrum. The spreading may be achieved at the transmitter by multiplying a symbol stream by a spreading code, e.g., a pseudo-random spreading code, at a higher chip rate than the symbol rate, where a "chip" is a symbol of the spreading code. The spread sequence may be pulse-shaped to limit spectral emissions by applying a filter to the chips.

At the receiver, the DSSS signal often appears below the noise floor, and it is this low power spectral density that provides the interference tolerance discussed above. A DSSS receiver may correlate the received signal against the spreading code, and a pulse-shaping filter, which may correspond to the pulse-shaping filter used at the transmitter, may be applied (e.g., if a pulse-shaping filter was used at the transmitter). This is often referred to as "chip-matched-filtering" (CMF), and may be used to maximize the received SNR in white Gaussian noise.

However, in the absence of some form of symbol synchronization between transmitter and receiver, the symbol instants may generally be unknown at the receiver. Consequently, the symbol instants may need to be estimated from the signal itself. In addition, the oscillators on the transmitter and receiver are often mismatched, which may result in a non-fixed symbol sampling requirement at the receiver, as well as unknown carrier frequency and phase offset. Typical methods of symbol timing may use a timing (phase) detector and a phase-locked loop (PLL) connected to some sort of adjustable sampling device (e.g., a sample switch or adaptive resampler).

However, symbol timing synchronization may be difficult when the symbol energy to noise power spectral density (referred to with the symbol $E_s/N_0$) is less than unity, or negative in terms of decibel units. In such cases, a PLL cannot be used because the loop SNR may be too low to maintain lock. In fact, in such cases it is often difficult to even detect that a signal is present.

One approach to the signal detection problem in unknown carrier offset conditions may involve non-coherent integration (NCI), an operation that may accumulate the magnitude of a signal at symbol-period intervals. Mathematically, the NCI can be described as a.

$$r_{nc}(k) = \frac{1}{N_{nc}} \sum_{n=0}^{N_{nc}-1} |d(k - nT_s)|$$

where k is the current NCI output sample, $T_s$ is the symbol period in samples (i.e., spreading code length (per symbol) in chips×samples/chip) and $N_{nc}$ is the NCI length. The magnitude of a complex sample is defined as the square root of the sum of the squares of the in-phase (I) and quadrature (Q) components, but it may also be implemented as a magnitude estimator.

If enough symbols have been integrated non-coherently, and if the oscillator mismatch and resulting timing slip does not cause the samples to become misaligned with the symbol period over that number of symbols, then the NCI may exhibit peaks at the appropriate symbol timing instants. In that case, these timing instants may be used to extract the symbol information in the despread stream.

However, for the case of oscillator mismatch, the samples may become misaligned. As a result, the NCI length may be limited because the peaks may become "smeared" over multiple samples, with the result being that the best timing instant may become obscured. To prevent significant smearing, the amount of integration $N_{nc}$ may be limited by the maximum oscillator drift between the transmitter and receiver as i.

$$N_{nc} < \frac{2}{\Delta_f T_s},$$

where $\Delta_f$ is the unitless relative amount of oscillator offset $$\Delta_f = \left|1 - \frac{f_T}{f_R}\right|$$

and $T_s$ is the symbol period in samples.

In addition, due to the integration group delay at the beginning of the reception, while the accumulation of NCI energy ramps up, peaks may be missed at the beginning of each reception, perhaps even many such peaks. Compounding that issue, the negative SNR condition and limited NCI duration may result in many "missing" peaks, i.e., locations throughout the reception that are not apparent above any practical threshold.

It may be desirable to have a receiver timing synchronization technique that addresses the above issues.

SUMMARY OF ASPECTS OF THE DISCLOSURE

Various aspects of the disclosure may address timing synchronization at a communication receiver, where the receiver may not be synchronized to a transmitter transmitting signals to the receiver. The receiver may despread received signals, may perform non-coherent integration, thresholding, peak selection, and/or backward and/or forward projection and may thus obtain timing instants based on which samples may be selected for further processing, which may include, e.g., demodulation and/or decoding.

Various aspects of the disclosure may be implemented in hardware, software and/or firmware, or combinations thereof.

BRIEF DESCRIPTION OF THE DRAWINGS

Various aspects of this disclosure will now be described in further detail in conjunction with the attached drawings, in which.

DETAILED DESCRIPTION

Figure 1A:
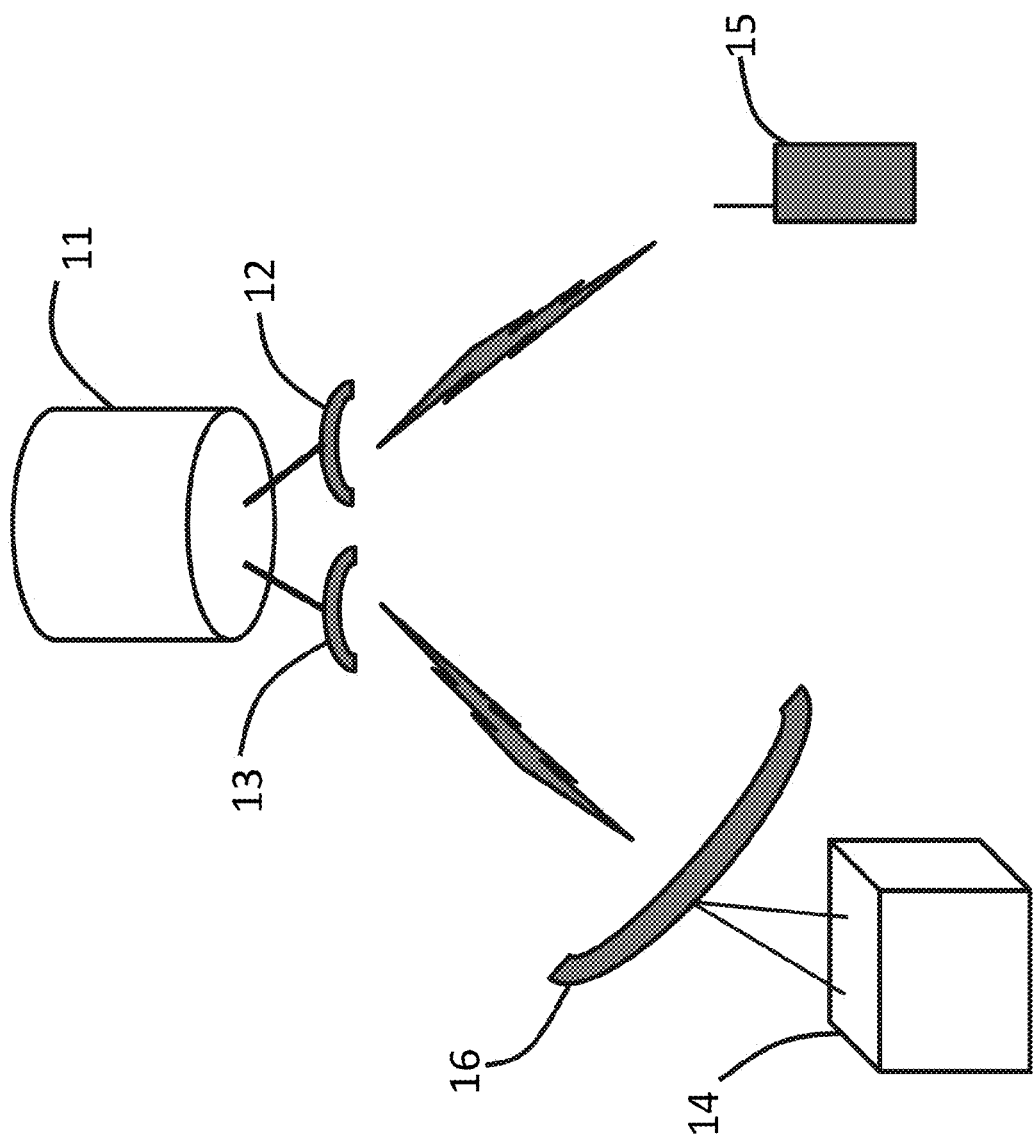
FIGS. 1A and 1B show examples of systems in which some aspects of the disclosure may be used.
Figure 1B:
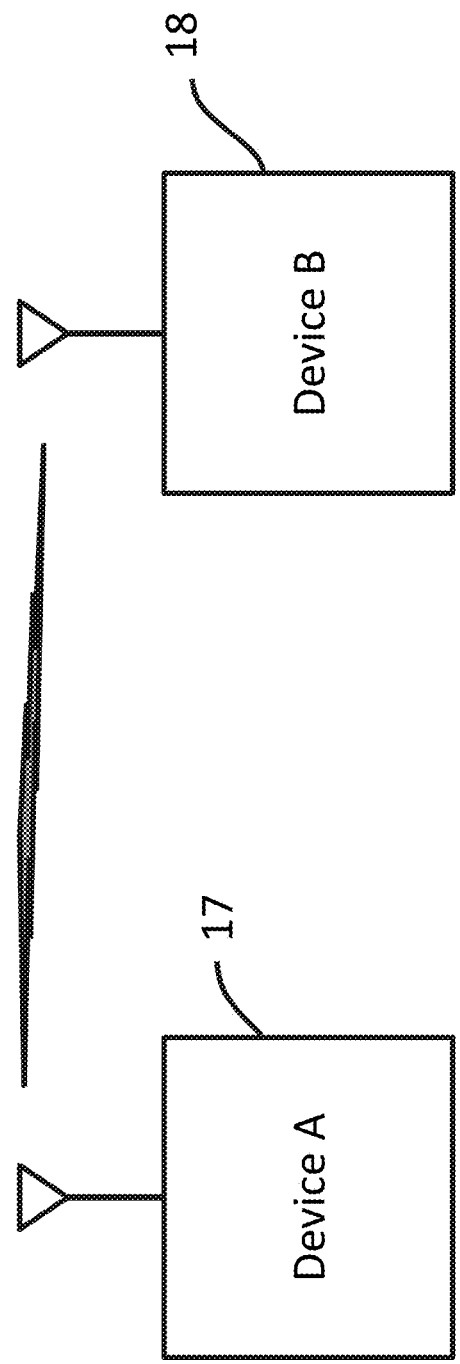

FIGS. 1A and 1B show conceptual examples of systems according to various aspects of this disclosure. In FIG. 1A, a satellite 11 may have at least two antennas 12, 13. In one aspect, satellite 11 may be a geosynchronous satellite and may contain a transponder, discussed below. The system may include one or more ground stations 14, which may have one or more antennas 16, which may facilitate communications with the satellite 11. The satellite 11 may also communicate with other stations 15, which may, e.g., be small and/or hand-held devices.

Ground station 14 may transmit an uplink signal to antenna 13 of satellite 11. Within satellite 11, the received uplink signal may be translated to another frequency and re-transmitted via antenna 12 as a downlink signal. The downlink signal may be received at device 15.

It is noted that, according to other aspects of this disclosure, block 11 need not be a satellite. Rather, it may be any repeater that translates an uplink signal in a first frequency band to a downlink signal of a second frequency band. For example, block 11 may, alternatively, represent a radio frequency (RF) repeater that has an uplink in one frequency band and a downlink on a different frequency band, and which re-transmits on the downlink.

In FIG. 1B, a first device (Device A) 17 may transmit a signal to a second device (Device B) 18 (or vice versa). Each device 17, 18 is shown with a single antenna, but it should be understood that either or both devices may incorporate multiple antennas. Either or both devices may be small (e.g., hand-held) devices or large devices (e.g., but not limited to, a base station).

In a system, for example, as in FIG. 1A or FIG. 1B, the transmitter at ground station 14 or at a transmitting device (17 or 18) may use DSSS, e.g., in order to transmit a signal below a predetermined energy level. However, the symbol timing at the ground station 14 or transmitting device (17 or 18) may not be known to receiving device 15 (or 18 or 17, respectively), as discussed above.

Figure 2:
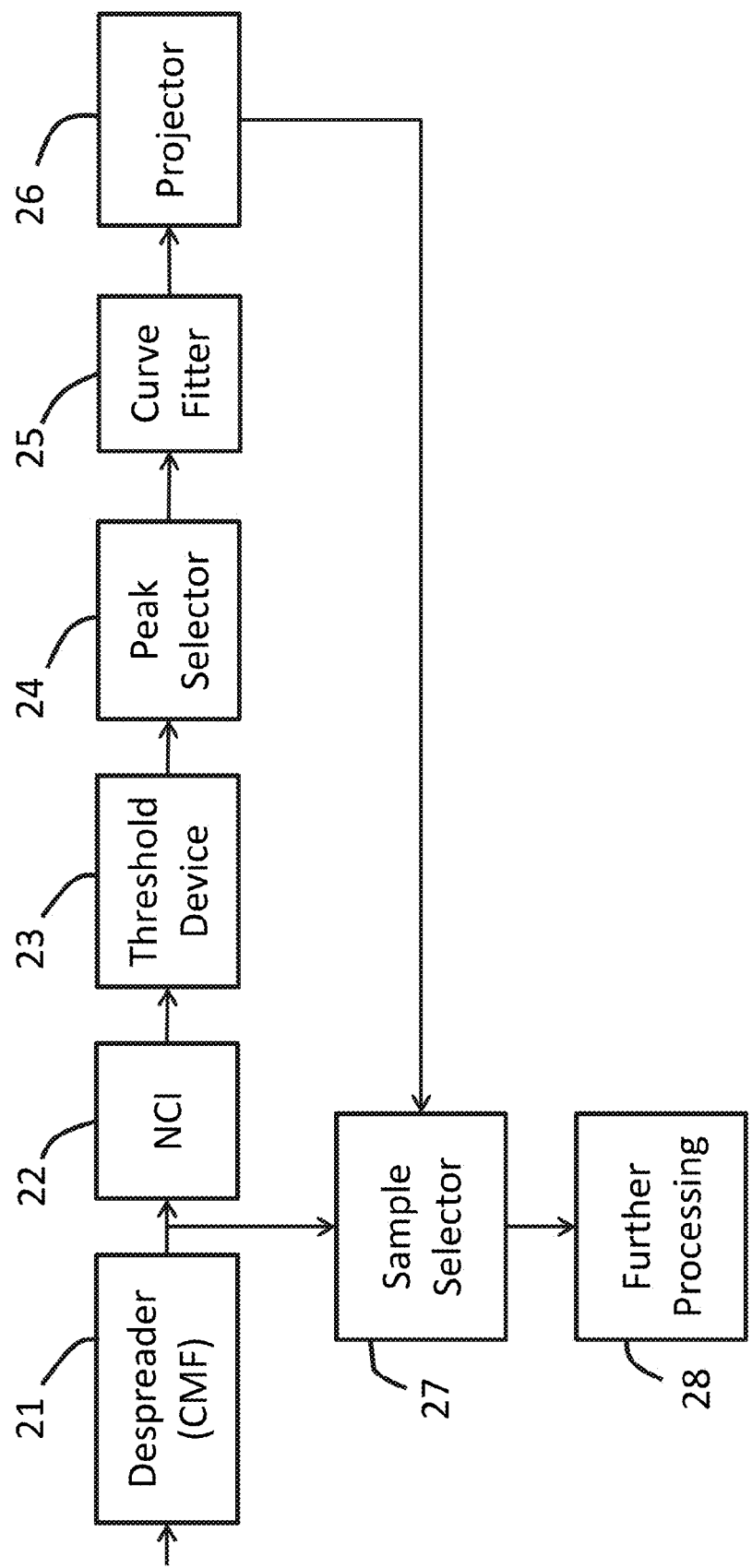
FIG. 2 shows a conceptual block diagram of an apparatus according to an aspect of the disclosure.
Figure 3:
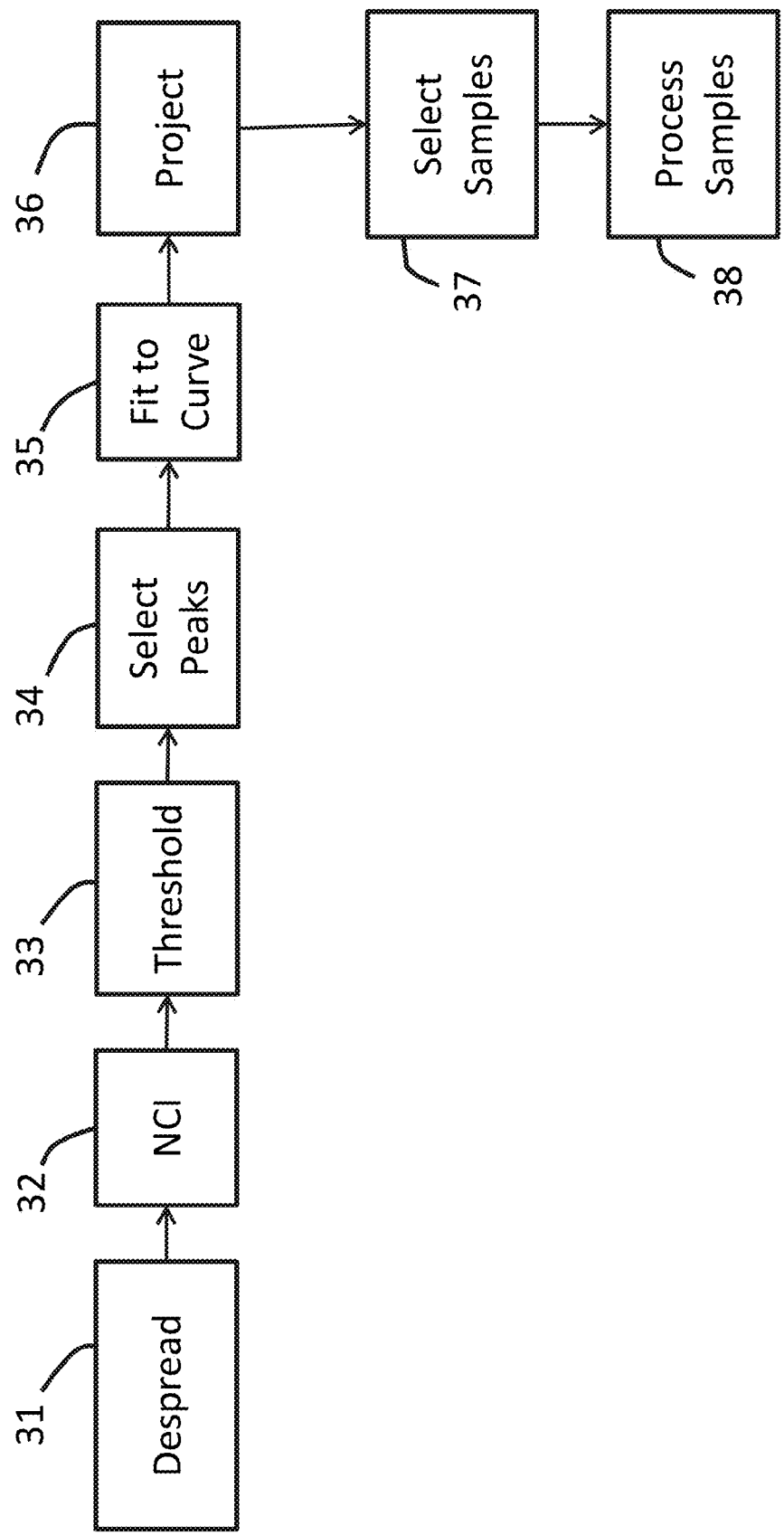
FIG. 3 shows a conceptual flow diagram of a method according to an aspect of the disclosure.

FIGS. 2 and 3 show examples of apparatus and methods according to various aspects of the disclosure. Various implementations of aspects of this disclosure may be in hardware, software, firmware, or combinations thereof. Hence, references to an element of FIG. 2 or FIG. 3 may generally apply to a corresponding element of the other figure, as well.

At the receiver, the received DSSS signal may be down-converted and sampled (not shown). The sampling may be performed at some predetermined sampling rate. In some aspects of this disclosure, oversampling may be used. The resulting samples may be input to despreader 21/despreading 31 may be performed. In a particular implementation, chip-matched filtering (CMF) may be used for despreading 31.

In the CMF, a pulse-shaping filter may be applied, which may help to minimize noise, and the result may be correlated against the known spreading sequence used in the DSSS signal. This may be done in either order, or these operations may be combined using "fast correlation."

The results of the despreading 31, i.e., despread symbol samples (which may generally be complex samples, i.e., with in-phase and quadrature components), may then be input to a non-coherent integrator (NCI) 22, where non-coherent integration (NCI) 32 may be performed. NCI may be performed according to the discussion above, based on a predetermined integration period of NM samples, which may correspond to a number of despread samples between symbols, and an integration length ($N_{nc}$), in symbols. In other words, one may conceptually consider receiving a matrix of $N_{nc}$ rows containing, say, NM samples per row, performing rectification on the entries of the matrix, and summing over each column of the matrix, by which may be obtained a vector of NM NCI results.

The NCI results may then be subjected to thresholding 33, e.g., by feeding them to a threshold device 23. The threshold used may be predetermined empirically/based on system parameters, or it may be computed, for example, by taking the threshold to be equal to a mean value (e.g., a mean value of the NCI results being presented for thresholding 33) multiplied by some predetermined factor or equal to a mean value plus some number of standard deviations (e.g., the mean and standard deviation may be computed based on the NCI results being presented); however, the invention is not thus limited. The outputs of the thresholding 33 may be a series of peak values that exceed the threshold.

The peak values that exceed the threshold may then be subjected to peak selection 34, e.g., using a peak selector 24. This may involve multiple sets of outputs from the NCI and thresholding operations. In this stage, a search may be performed over the peak values to locate local maxima and to select sets of peaks that may correspond to symbols received, e.g., from multiple stations (e.g., device 15, as in FIG. 1A, or multiple devices, e.g., 18, received by a single device, e.g., 17, as in FIG. 1B), which may thereby aid in identifying symbol timings for the various received signals (this technique may also be used if only a single signal is received).

In an initial operation of peak selection 34, an overall maximum peak may be selected. In the absence of timing drift, one would be able to simply move forward and backward in time by a symbol interval (e.g., the duration of the NM samples, discussed above) to locate corresponding symbols of a particular signal. However, given that there may be timing drift, it may be desirable to search forward and backward in time from the maximum peak using a window of samples, e.g., a set of samples located within a window of width $2\Delta$, where $\Delta$ is some predetermined number of sample times selected to accommodate an expected maximum drift, and centered around an integer number of symbol times from the maximum peak (i.e., a set of samples in an interval $[KNM-\Delta, KNM+\Delta]$, where K is an integer). In one example implementation, to which the invention is not limited, $\Delta=2$. Each window may be searched for a peak. If a peak is found, its sample time instant may be recorded as a sample time for the present series of peaks; it is noted that a peak may not be located in every search window, i.e., some sample times may be "missed." According to one aspect of this disclosure, the search may be performed in one direction, e.g., backwards from the initial maximum peak, and then in the other direction, e.g., forwards from the initial maximum peak.

The search in each direction may be limited in duration. According to one aspect of this disclosure, the search may continue in a given direction until a predetermined number of peaks are "missed," as noted above. According to another aspect, the search may continue in one direction for the equivalent duration of a half packet length, a full packet length, or some other predetermined duration. According to yet another aspect, these two "stop criteria" may be combined; a total miss criterion and a fixed limit may both be applied in one or both directions. In one particular implementation, 800 symbols may be the fixed duration in the backward direction, and a full packet length, less 300 symbols, may be the fixed duration in the forward direction; however, the invention is not thus limited.

After the search is applied with respect to the overall maximum peak, the identified peaks may be removed from consideration (e.g., by marking them as "selected" or by some other technique). Further searches may be applied based on other maximum peaks (e.g., a next largest peak, a third largest peak, etc.), to thus identify further groups of peaks that may correspond to one or more further packets from one or more further particular signals, which may, e.g., be from a different transmitter from that corresponding to the signal associated with the maximum peak (alternatively, in the case of receiving a single signal, it is possible that the group of peaks corresponding to the maximum peak may not correspond to a true transmission, and the search or searches performed on one or more of the other maximum peaks may find the true transmission). Again, once a peak is selected for inclusion in a group, it may not be considered for inclusion in a further group.

Following the formation of groups of sample times corresponding to different sets of peaks (which may correspond to different received signals), as discussed above, curve fitting 35, e.g., using curve fitter 25, may be applied based on the peak locations versus sample times to provide some function that may describe the drift in timing for the sample intervals of a given signal (i.e., a given group of selected sample times/peaks). In one aspect of this disclosure, this may be a polynomial curve-fitting, and it may be a least-squares, first-order polynomial fitting. However, the invention is not thus limited, and other curve fitting techniques may be applied.

Once curve fitting 35 has been performed, the curve may be projected backwards and forwards in time 36 (e.g., using projector 26) to provide a group of peaks. Projection 36 may go backwards at least far enough to cover the group delay associated with the NCI 32 and may go at least far enough forwards to ensure a complete reception. This technique may be used to obtain timing instants corresponding to a particular signal to be received; this may be repeated for peaks corresponding to other signals, if present and if it is desired to also receive them.

The timing instants generated by projection 36 may then be used to select 27, 37 appropriate samples corresponding to a given signal to process, and the resulting samples may be subject to further processing 28, 38. The further processing 28 may include, e.g., demodulation and decoding; but the invention is not thus limited. Demodulation may include, e.g., frequency correction and symbol detection; but again, it is not thus limited.

Figure 4:
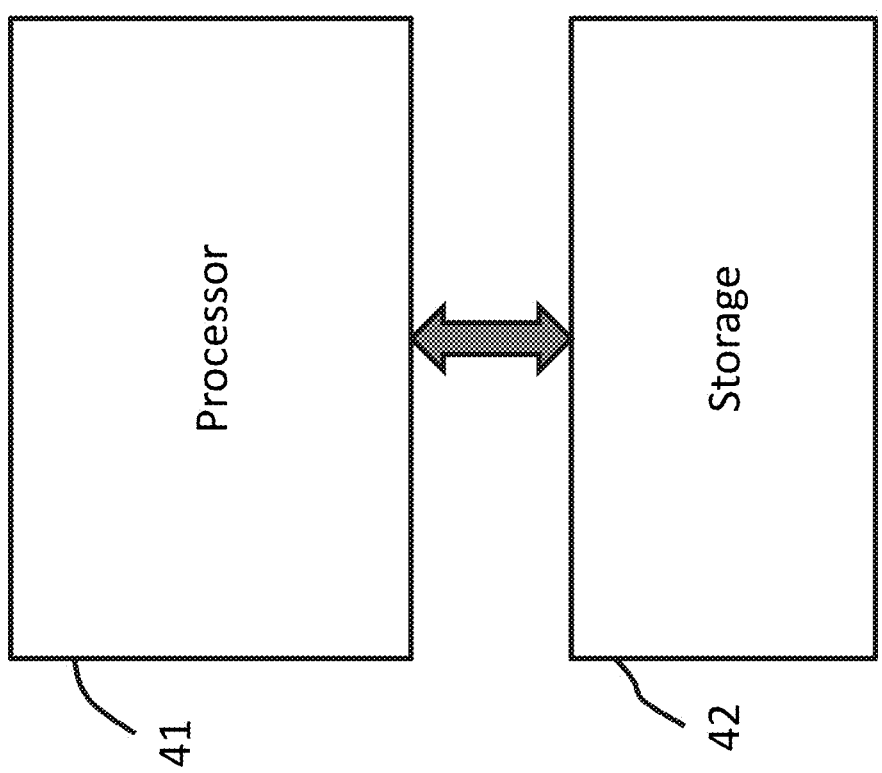
FIG. 4 shows a conceptual block diagram of an apparatus according to an aspect of the disclosure.

FIG. 4 shows a conceptual block diagram of an apparatus that may be used to implement various aspects of the disclosure. The apparatus may include at least one processor 41 and one or more storage devices 42. Storage device(s) 42 may be communicatively coupled to processor(s) 41 and may be used to store data and/or executable instructions that may result in the implementation of various operations discussed above. At least one processor 41 may correspond to one or more of the following: a microprocessor, a graphics processing unit (GPU), a central processing unit (CPU), a computer (of any type), a hand-held computing device (e.g., but not limited to a mobile telephone (which may be a smartphone), a tablet computer, a personal digital assistant (PDA), etc.) or other processing/computing device. Storage device 42 may be one or more memory devices, which may include, e.g., but which are not limited to, read-only memory (ROM) or random-access memory (RAM), or their variations (EPROM, EEPROM, DRAM, SRAM, etc.), flash memory, disk memory (e.g., magnetic, optical, CD, DVD, etc.), etc.

Various aspects of the disclosure have been presented above. However, the invention is not intended to be limited to the specific aspects presented above, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A method of symbol timing estimation, the method including:
   obtaining peak integration values from despread symbol samples of a received direct-sequence spread-spectrum signal;
   selecting a set of peaks from the peak integration values by finding a maximum of the peak integration values and searching for further peaks within predetermined time windows in backward and forward directions in time;
   using the set of peaks to select from the despread symbol samples a group of the despread symbol samples;
   further processing the group of despread symbol samples;
   applying curve fitting to the set of peaks; and
   projecting results of the curve fitting backwards and forwards in time to obtain a group of sampling instants,
   wherein using the set of peaks comprises using the group of sampling instants to select the group of despread symbol samples.

2. The method of claim 1, wherein obtaining the peak integration values comprises:
   performing non-coherent integration on at least a subset of the despread symbol samples to obtain integrated values; and
   applying a threshold to the integrated values to obtain the peak integration values.

3. The method of claim 1, wherein the curve fitting is polynomial curve fitting.

4. The method of claim 2, further including computing the threshold based on at least a subset of the integrated values.

5. The method of claim 2, wherein the threshold is a predetermined value.

6. The method of claim 4, wherein computing the threshold comprises obtaining a mean of the at least a subset of the integrated values.

7. The method of claim 6, wherein computing the threshold further comprises obtaining the threshold by performing a process selected from the group consisting of:
obtaining a standard deviation of the at least a subset of the integrated values and adding to the mean a multiple of the standard deviation; and
multiplying the mean by a predetermined factor.

8. A non-transitory computer readable medium having stored thereon executable instructions configured to result in the implementation of operations including:
obtaining peak integration values from despread symbol samples of a received direct-sequence spread-spectrum signal;
selecting a set of peaks from the peak integration values by finding a maximum of the peak integration values and searching for further peaks within predetermined time windows in backward and forward directions in time; and
using the set of peaks to select from the despread symbol samples a group of the despread symbol samples;
further processing the group of despread symbol samples;
applying curve fitting to the set of peaks; and
projecting results of the curve fitting backwards and forwards in time to obtain a group of sampling instants,
wherein using the set of peaks comprises using the group of sampling instants to select the group of despread symbol samples.

9. The non-transitory computer readable medium of claim 8, wherein the operations further include:
performing non-coherent integration on at least a subset of the despread symbol samples to obtain integrated values; and
applying a threshold to the integrated values to obtain the peak integration values.

10. The non-transitory computer readable medium of claim 8, wherein the curve fitting is polynomial curve fitting.

11. An apparatus to perform symbol timing synchronization, the apparatus including:
at least one processor; and
the non-transitory computer readable medium according to claim 8.

12. The non-transitory computer readable medium of claim 9, wherein the operations further include computing the threshold based on at least a subset of the integrated values.

13. The non-transitory computer readable medium of claim 9, wherein the threshold is a predetermined value.

14. The non-transitory computer readable medium of claim 12, wherein computing the threshold comprises obtaining a mean of the at least a subset of the integrated values.

15. The non-transitory computer readable medium of claim 14, wherein computing the threshold further comprises obtaining the threshold by performing a process selected from the group consisting of:
obtaining a standard deviation of the at least a subset of the integrated values and adding to the mean a multiple of the standard deviation; and
multiplying the mean by a predetermined factor.

16. A symbol timing synchronization apparatus, including:
a non-coherent integrator coupled to receive despread symbol samples obtained from a received direct-sequence spread-spectrum signal and configured to output integrated values based on the despread symbol samples;
a thresholding device configured to apply a threshold to the integrated values to obtain peak integration values;
a peak selector configured to:
find a maximum of the peak integration values;
search for further peaks within predetermined time windows in backward and forward directions in time; and
select a set of peaks based on the maximum and the further peaks; and
a sample selector configured to receive the despread symbol samples and configured to select, based on timing instants derived from the set of peaks, a group of the despread symbol samples for further processing, and
the apparatus further including:
a curve fitter configured to apply curve fitting to the set of peaks; and
a projection module configured to project results of the curve fitting backwards and forwards in time to obtain a group of sampling instants and to provide the group of sampling instants to the sample selector.

17. The apparatus of claim 16, wherein the thresholding device is configured to compute the threshold based on at least a subset of the integrated values.

18. The apparatus of claim 16, wherein the threshold is a predetermined value.

* * * * *